UNITED STATES PATENT OFFICE.

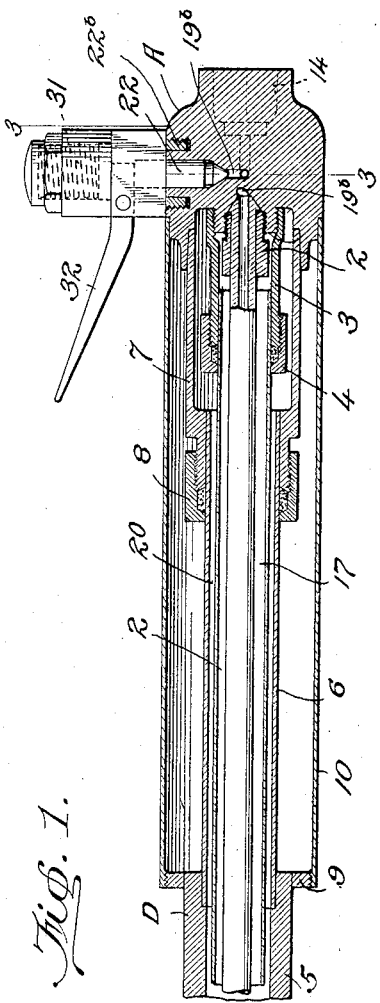

GEORGE ADELARD BAUDET, OF NEW YORK, N. Y., ASSIGNOR TO THE BAUDET MANUFACTURING COMPANY, OF WOONSOCKET, RHODE ISLAND, A CORPORATION OF RHODE ISLAND.

WELDING AND CUTTING TORCH.

1,361,667.  Specification of Letters Patent.  Patented Dec. 7, 1920.

Application filed January 9, 1920. Serial No. 350,353.

*To all whom it may concern:*

Be it known that I, GEORGE A. BAUDET, a citizen of the United States, residing at New York, in the county of New York and State of New York, have invented certain new and useful Improvements in Welding and Cutting Torches, of which the following is a specification.

The oxy-acetylene welding and cutting torch, as generally constructed, comprises three independent tubes for conveying the gases from the inlet end of the torch to the outlet end, with a suitable handle portion, and various valves and fittings for controlling the gas flow and for connecting the torch with the gas tanks. Many of these torches are unwieldy because of the unnecessary weight and the construction and arrangement of the fittings, which interfere with handling the torch. The purposes of my invention are to provide a well balanced torch, relatively light in weight, and as free as possible from such projecting parts as would interfere with the handling of the torch and which can be inexpensively made, largely from metal tubes and bars, such as are generally carried in stock; also to provide improved means for mixing the oxygen and acetylene gases during their passage to the nozzle.

In the accompanying drawing,—

Figure 1 is a central, longitudinal section through a torch embodying my improvements, the torch being provided with heating and cutting nozzles;

Fig. 2 is a similar section through the welding nozzle;

Fig. 3 is a section on the line 3—3 of Fig. 1;

Fig. 4 is a section on the line 4—4 of Fig. 3;

Fig. 5 is a section on the line 5—5 of Fig. 1; and,

Fig. 6 is a perspective view of the mixing nozzle.

Referring to the drawing, A and B indicate, respectively, the inlet and outlet heads of the torch, and C and D indicate inner and outer concentric tubes connecting said heads. Between the tubes C and D and spaced from both, is an intermediate tube E, shorter than the other tubes and connected to the head A only. The inner tube C is of small diameter and has one end, 1 threaded into a central opening in the head B, and the opposite end of the tube fits into a central opening in the head A and is secured therein by a threaded sleeve 2. The intermediate tube E is connected to the head A by a sleeve 3, having a threaded connection with said head, and a packing nut 4, surrounding the tube is threaded on to said sleeve and forms a tight joint between the tube and the sleeve, which latter, in effect, forms a part of the tube. The opposite end of the tube E fits on to a mixing nozzle F, which nozzle fits tightly upon the tube C and fills the space between said tube and the outer tube D. The outer tube D, as shown, is composed of the sections 5 and 6 and a sleeve 7 which connects the section 6 with the head A, the joint between said sleeve and the section 6 being made gas-tight by a packing nut 8 which surrounds the section 6 and is threaded on to the sleeve 7 and compresses a suitable packing around the joint between the parts. A collar 9 is secured to the outer tube at a point where the sections 5 and 6 meet, and a section of tubing 10, of suitable diameter to be easily grasped in the hand, is threaded onto said collar and to the head A and serves as a handle for the torch. The nozzle F has straight perforations 11, which extend from the space between the tubes C and E into the space 12, between the inner and outer tubes, and the nozzle also has spiral channels 13 on its periphery, which channels extend from the space between the tubes E and D to the space 12, these spiral channels at their outlet ends meeting the outlet ends of the perforations 11. The part $f$ of the head, in which the channels are formed, fits snugly within the outer tube and the latter therefore forms an outer wall for the channels. The channels, therefore, in effect, constitute spiral perforations.

The head A is provided at its outer end with a threaded socket 14, adapted to receive a threaded coupling on the flexible pipe leading from the oxygen tank, and also with a similar threaded socket 15, adapted to receive the coupling on a pipe leading from the acetylene gas tank. From the opening 15, a passageway 16 extends through the head to the space 17 between the tubes C and E, and this passageway is controlled by a needle valve 18. From the socket 14, a passageway 19 leads to the center of the head and there divides. one fork $19^a$ of the passageway leading to the space 20 between the intermediate and outer tubes E and D, the other fork 19$^b$ leading to the interior of the inner tube C. The fork 19$^a$ is controlled by a needle valve 21 and the fork 19$^b$ is controlled by a spring pressed valve 22.

It will be seen that by opening the valve 18, acetylene gas may be admitted through the space 17, within the tube E, to the nozzle F, and thence through the perforations 11 to the mixing chamber 12, and by opening the valve 21, oxygen may be admitted, through the space 20 within the tube D, to the spiral passageways 13 in the nozzle F and thence to the mixing chamber. The spiral arrangement of the channels causes a whirling motion to be given to the gases in the mixing chamber, resulting in a thorough mixture. By opening the valve 22, oxygen will be admitted directly to the inner tube C. The head B is provided with a channel 23, leading from the end of the tube C to a central socket 24, adapted to receive the cutting nipple 25, and the head is also provided with a passageway 26, leading from the mixing chamber 12 to a socket 27, which is adapted to receive either the heating nozzle 28, shown in Fig. 1, or the welding nozzle 29, shown in Fig. 2.

It will be noted that the torch has no laterally projecting parts, such as would interfere with the handling of the torch, except the valves on the head A, and these are secured to the head in such manner as to project as slightly as possible. Thus, as shown in Fig. 3, the head A is made from a section of a rolled hexagonal bar, and through the faces of the bar holes $a$ are bored and threaded to receive the threaded stems of the valves 18 and 21. Circular channels $a'$ are cut in the metal concentric with the bores $a$ and the outer walls of these channels are threaded. Packing nuts 18$^a$ and 21$^a$ surround the valve stems and these nuts are provided with threaded sleeves 18$^b$ and 21$^b$ which enter the channels or recesses and engage the threads therein. The heads of the nuts are hollow to receive the packing material 30, and when the nuts are tightened, this material is compressed against the valve stems and against the annular shoulders $a^2$ which are formed between the bars $a$ and the recesses $a'$. Thus, gas-tight joints are formed around the valve stems without having projecting nipples on the head as is customary where packing nuts are required. This arrangement, aside from the desirability of avoiding the use of projecting nipples, makes it possible to use rolled stock instead of machined castings. The spring pressed valve 22 is mounted in a housing 22$^a$ which has, at its base, a threaded sleeve 22$^b$ fitting into a threaded annular recess 22$^c$, which recess is concentric with the bore 22$^d$ in the head, in which the valve 22 slides. A packing 30$^a$ is held against the valve stem by the housing 22$^a$ in the same manner as the packing is held by the packing nuts surrounding the valves 18 and 21. The valve 22 is normally held to its seat by a spring 31, shown in dotted lines, and a forked lever 32, pivoted in the valve housing, is provided for the purpose of lifting the valve from its seat when desired.

In operation, for welding, the nozzle 29 is fitted to the torch and the valves 18 and 21 are adjusted to admit acetylene gas and oxygen through the passageways 17 and 20, respectively, these gases passing through the nozzle F to the mixing chamber 12, and then through the nozzle 29, where they are ignited. For cutting purposes, the nozzles 25 and 28 are attached to the torch, as shown in Fig. 1, and the oxygen and acetylene gases are permitted to flow as just described through the nozzle 28, and after the metal has been heated, the lever 32 is depressed, causing the valve 22 to be lifted and oxygen is thereby allowed to flow through the central tube C to the nozzle 25 and out through said nozzle.

What I claim is:

1. A welding and cutting torch comprising an inlet head having three inlet openings, an outlet head having two outlet openings, inner and outer tubes secured to said heads and connected to independent openings therein, an intermediate tube, shorter than the other tubes and connected to the inlet head only, said tubes being spaced apart, and a nozzle at the outlet end of the intermediate tube forming a partition across the spaces between the several tubes and having perforations for permitting gas to pass from both of said spaces to the outlet head.

2. A welding and cutting torch comprising an inlet head having three inlet openings, an outlet head having two outlet openings, inner and outer tubes secured to said heads and connected to independent openings therein, an intermediate tube, shorter than the other tubes and connected to the inlet head only, said tubes being spaced apart, and a nozzle at the outlet end of the intermediate tube forming a partition across the spaces between the several tubes and having perforations for permitting gas to pass from both of said spaces to the outlet head, the perforations from one space extending at an angle to the axis of the tubes.

3. A torch comprising inlet and outlet heads provided with passageways, inner and outer tubes secured to said heads and connecting with independent passageways therein, an intermediate tube secured at one end to the inlet head and connected to a separate passageway therein, a mixing nozzle at the other end of said intermediate tube, a tube secured to the inlet head and surrounding a part of said outer tube and forming the handle portion of the torch, and valves controlling the passageways in the inlet head.

4. A torch comprising an inlet head having three valve controlled passageways, inner, outer and intermediate tubes secured to said head and connecting with separate passageways therein, an outlet head secured to the inner and outer tubes and having concentric sockets for receiving nozzles and passageways leading from the inner tube to the inner socket and from the outer tube to the outer socket, and a mixing nozzle at the end of the intermediate tube adjacent the outlet head.

5. A cutting and welding torch having a stock provided with a nozzle and consisting of terminal inlet and outlet heads having channels, concentric inner, outer and intermediate tubes connecting the channels in one head with those in the other to form communicating passages, and valves carried by the inlet head for controlling the several passages.

6. A cutting and welding torch having a stock provided with a nozzle and consisting of terminal inlet and outlet heads having channels, concentric inner, outer and intermediate tubes connecting the channels in one head with those in the other to form communicating passages, a housing sleeve extending from the inlet head to inclose and form a grip surrounding said concentric tube, and valves carried by the inlet head for controlling the several passages.

7. A cutting and welding torch having a stock provided with a nozzle and consisting of terminal inlet and outlet heads having channels, concentric inner, outer and intermediate tubes of respectively uniform diameters connecting the channels in one head with those in the other to form communicating passages, and valves carried by the inlet head for controlling the several passages.

8. A cutting and welding torch having a stock provided with a nozzle and consisting of terminal inlet and outlet heads having channels, concentric inner, outer and intermediate tubes of respectively uniform diameters connecting the channels in one head with those in the other to form communicating passages, the intermediate tube terminating short of the outlet head, and a mixing nipple fitting in the interval between the walls of the inner and outer tubes and channeled in communication with the intermediate and outer passages between said tubes.

9. A cutting and welding torch having a stock provided with a nozzle and consisting of terminal inlet and outlet heads having channels, concentric inner, outer and intermediate tubes of respectively uniform diameters connecting the channels in one head with those in the other to form communicating passages, the intermediate tube terminating short of the outlet head to form a mixing chamber between the walls of the inner and outer tubes and a mixing nipple fitted in the interval between the walls of the inner and outer tubes and channeled in communication with the intermediate and outer passages between said tubes and connecting the same with the mixing chamber.

10. A cutting and welding torch having a stock provided with a nozzle and consisting of terminal inlet and outlet heads having channels, concentric inner, outer and intermediate tubes of respectively uniform diameters connecting the channels in one head with those in the other to form communicating passages, the inlet head consisting of a block provided at one end with bored seats for supply pipe ends and at the other end with concentric channels for engagement by the terminals of the concentric tubes, bores in alinement with said seats extending therefrom to the spaces between the channels and transverse bores from the side surfaces of the block extending to and intersecting the first named bores, and valves seated in the last named bores to control the passage of fluid through the first named bores.

In testimony whereof I affix my signature.

GEORGE ADELARD BAUDET.